United States Patent [19]

De Candia

[11] 4,256,947

[45] * Mar. 17, 1981

[54] CAR BODY WELDING ASSEMBLY SYSTEM

[76] Inventor: Ettore De Candia, 78240 Chambourcy, Montaigu, France

[*] Notice: The portion of the term of this patent subsequent to Jul. 24, 1996, has been disclaimed.

[21] Appl. No.: 59,453

[22] Filed: Jul. 20, 1979

Related U.S. Application Data

[63] Continuation-in-part of Ser. No. 803,960, Jun. 6, 1977, Pat. No. 4,162,367.

[51] Int. Cl.³ ............................................... B23K 9/12
[52] U.S. Cl. .................................. 219/79; 219/86.24; 219/158
[58] Field of Search ............... 219/79, 80, 86.24, 86.7, 219/158, 161

[56] References Cited

U.S. PATENT DOCUMENTS

| | | | |
|---|---|---|---|
| 2,215,693 | 9/1940 | Fleming | 219/86.24 X |
| 3,288,978 | 11/1966 | Trygar | 219/80 |
| 3,475,579 | 10/1969 | Moyer | 219/80 X |
| 3,654,616 | 4/1972 | Dunne | 219/79 X |
| 3,744,032 | 7/1973 | Engelberger | 219/80 X |
| 4,160,147 | 7/1979 | Matsubara | 219/80 X |
| 4,162,387 | 7/1979 | Candia | 219/79 |

Primary Examiner—Richard R. Kucia

[57] ABSTRACT

A body assemby system for welding multiple component parts of different vehicle bodies into interfixed assembled relation at successive framing and finish welding stations including means for accurately locating preliminary preassembled component parts in required accurate geometric relation at a framing station, with programmable welding means for producing different initial retention welds at the framing station as well as finish welds at successive "respot" welding stations as required for the different bodies. The system includes means for rapidly positioning locating tooling for the multiple component parts at the framing station as required for different bodies as well as means to minimize and facilitate change of special tooling for model changeover.

25 Claims, 18 Drawing Figures

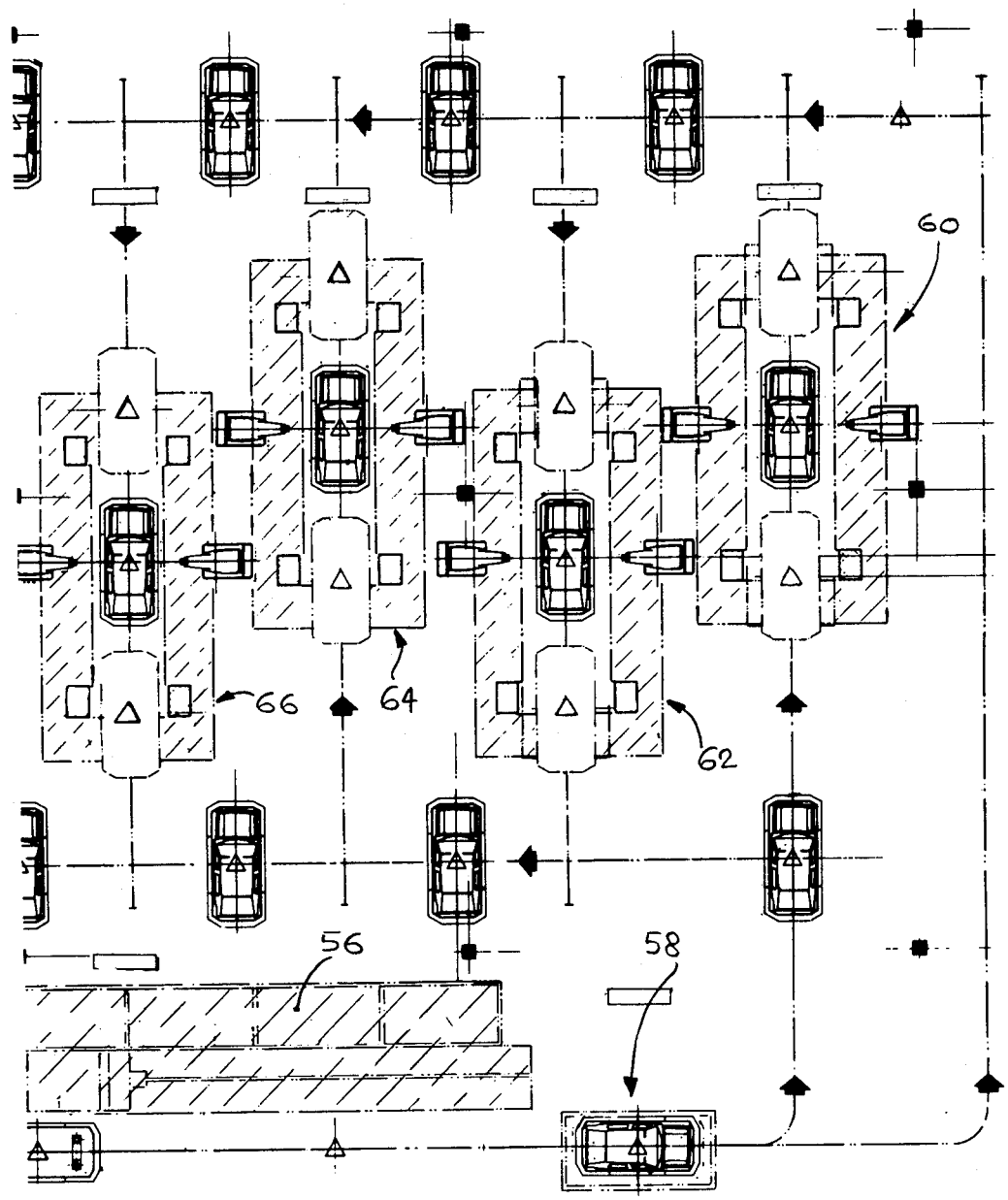

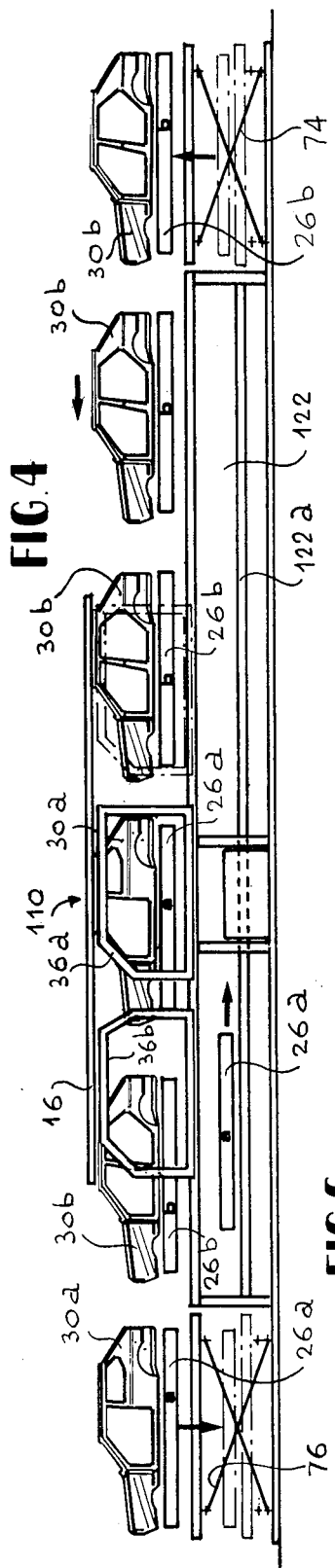
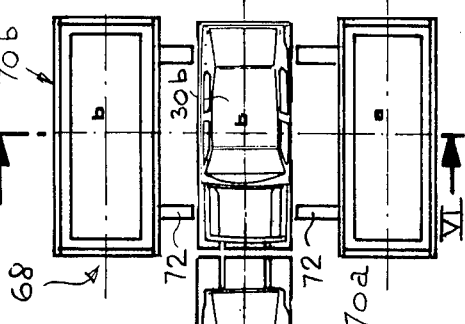
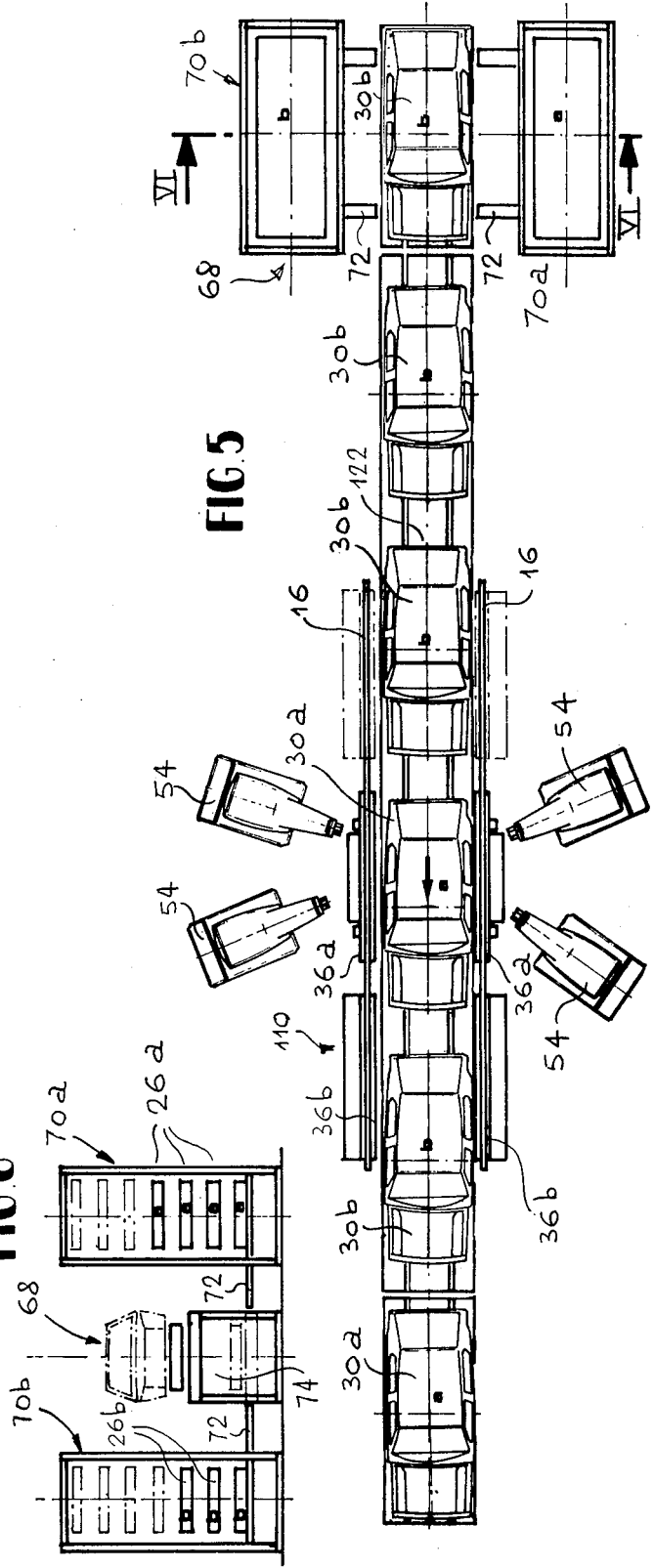

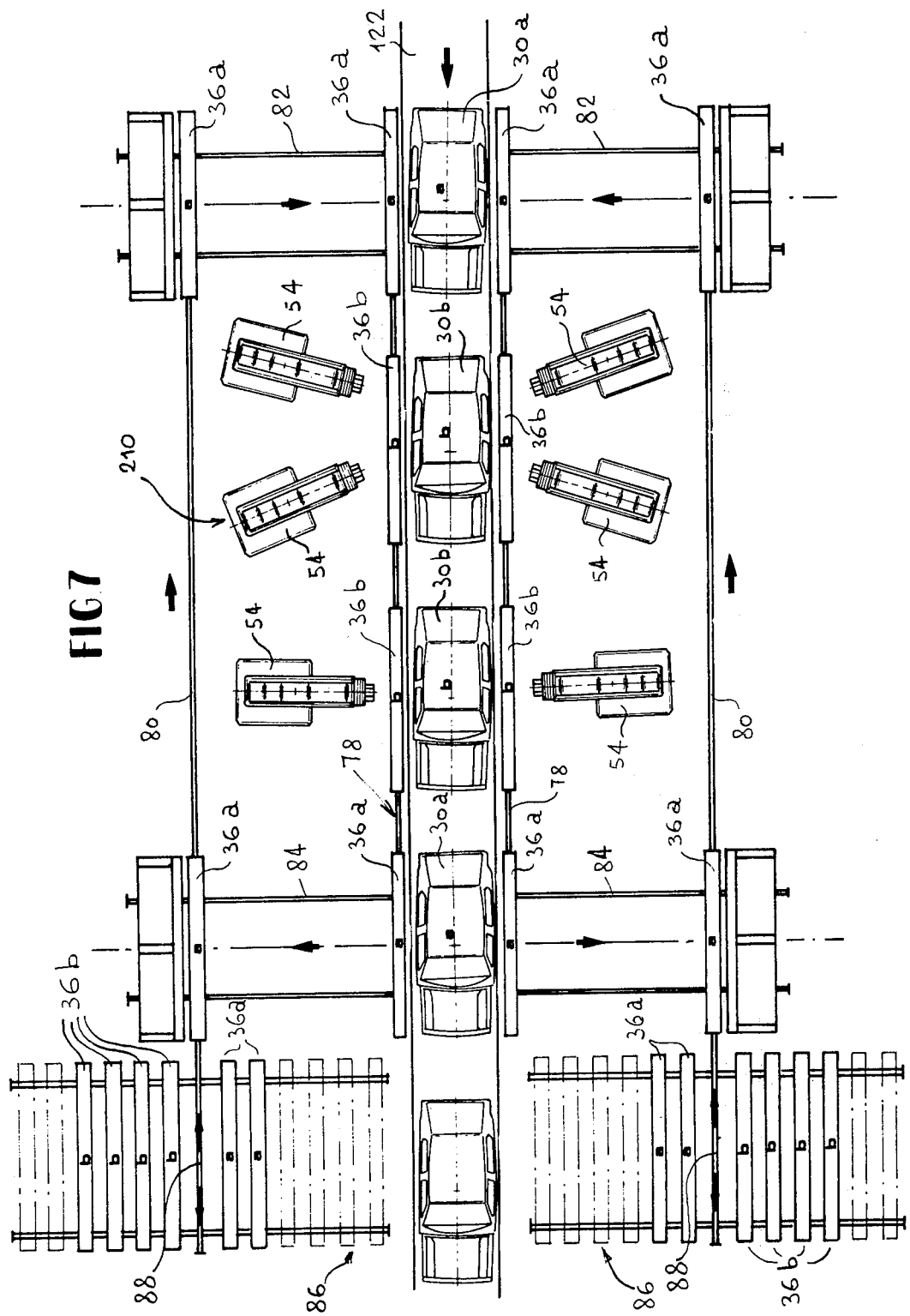

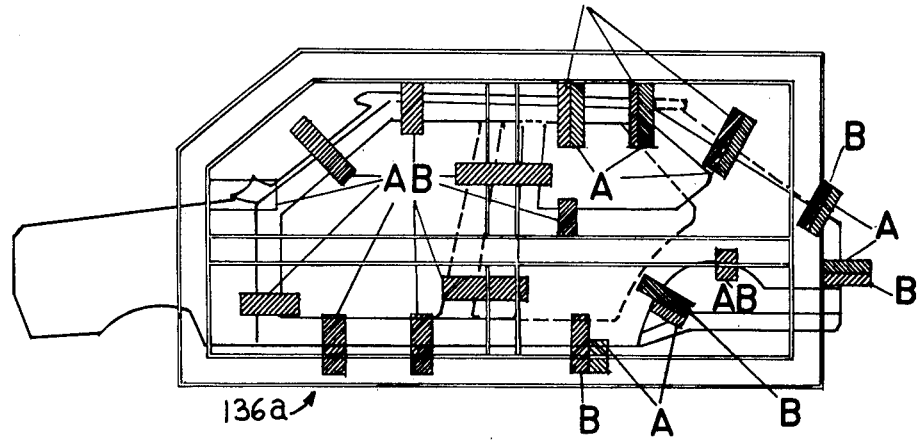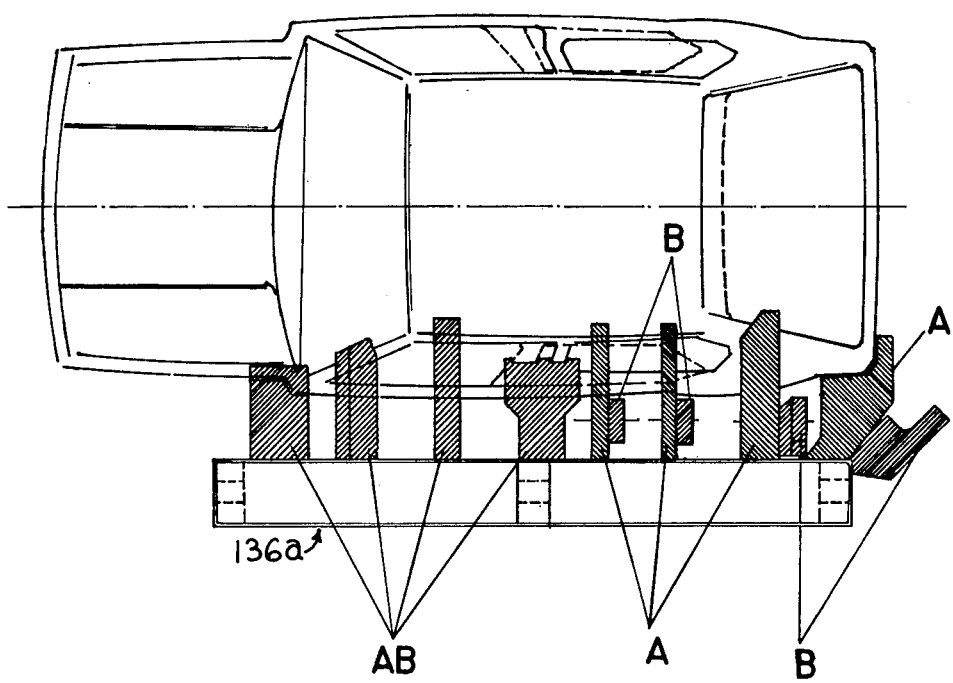

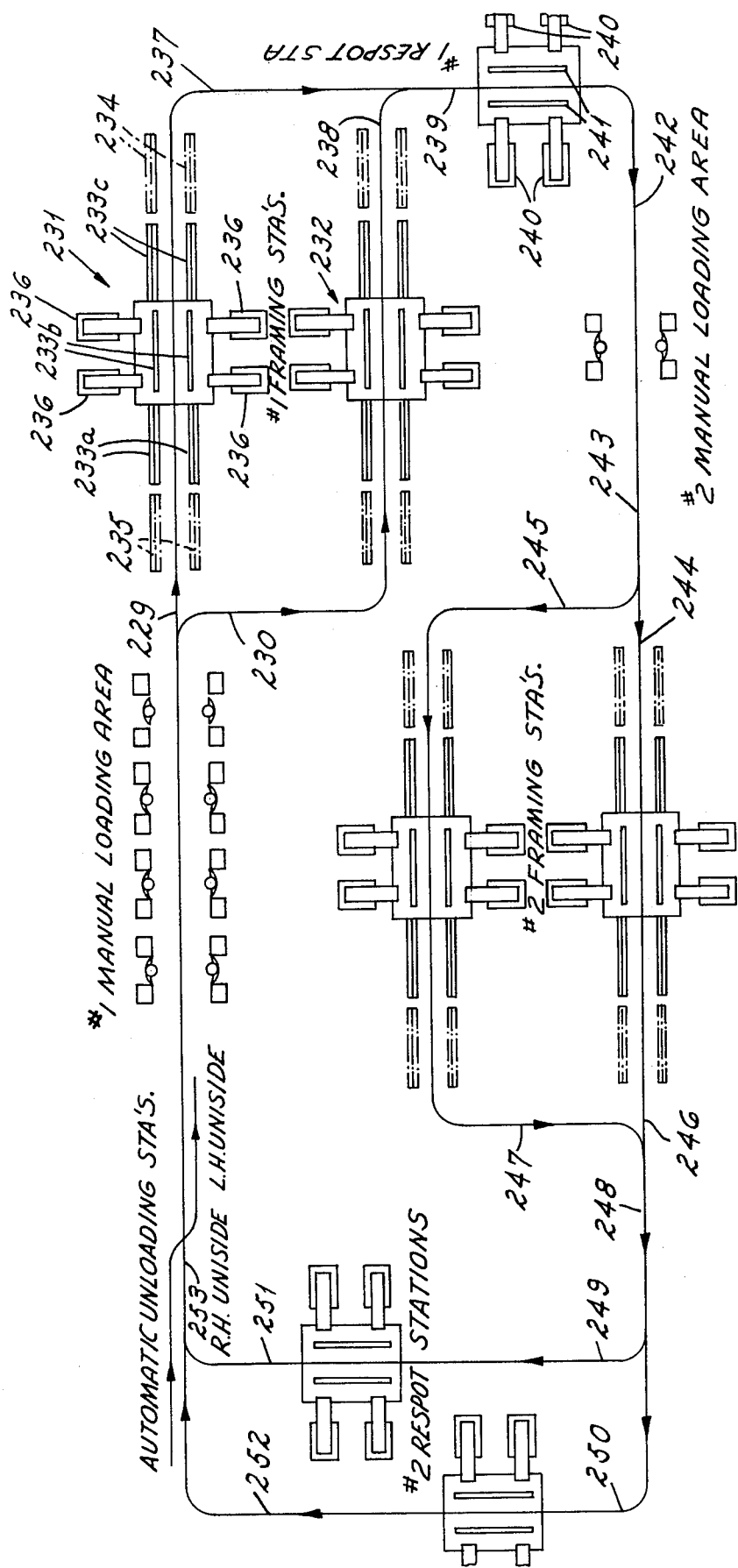

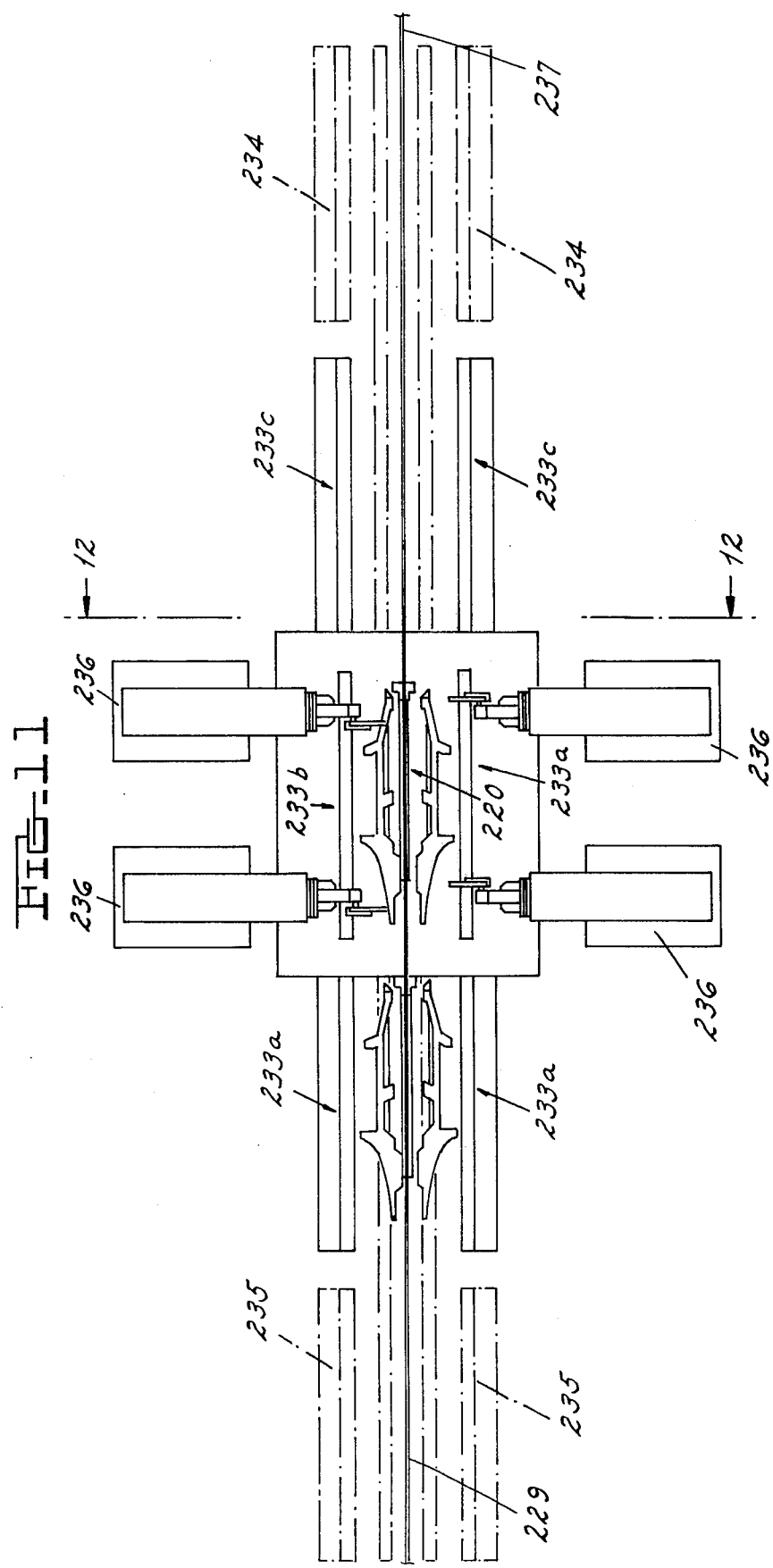

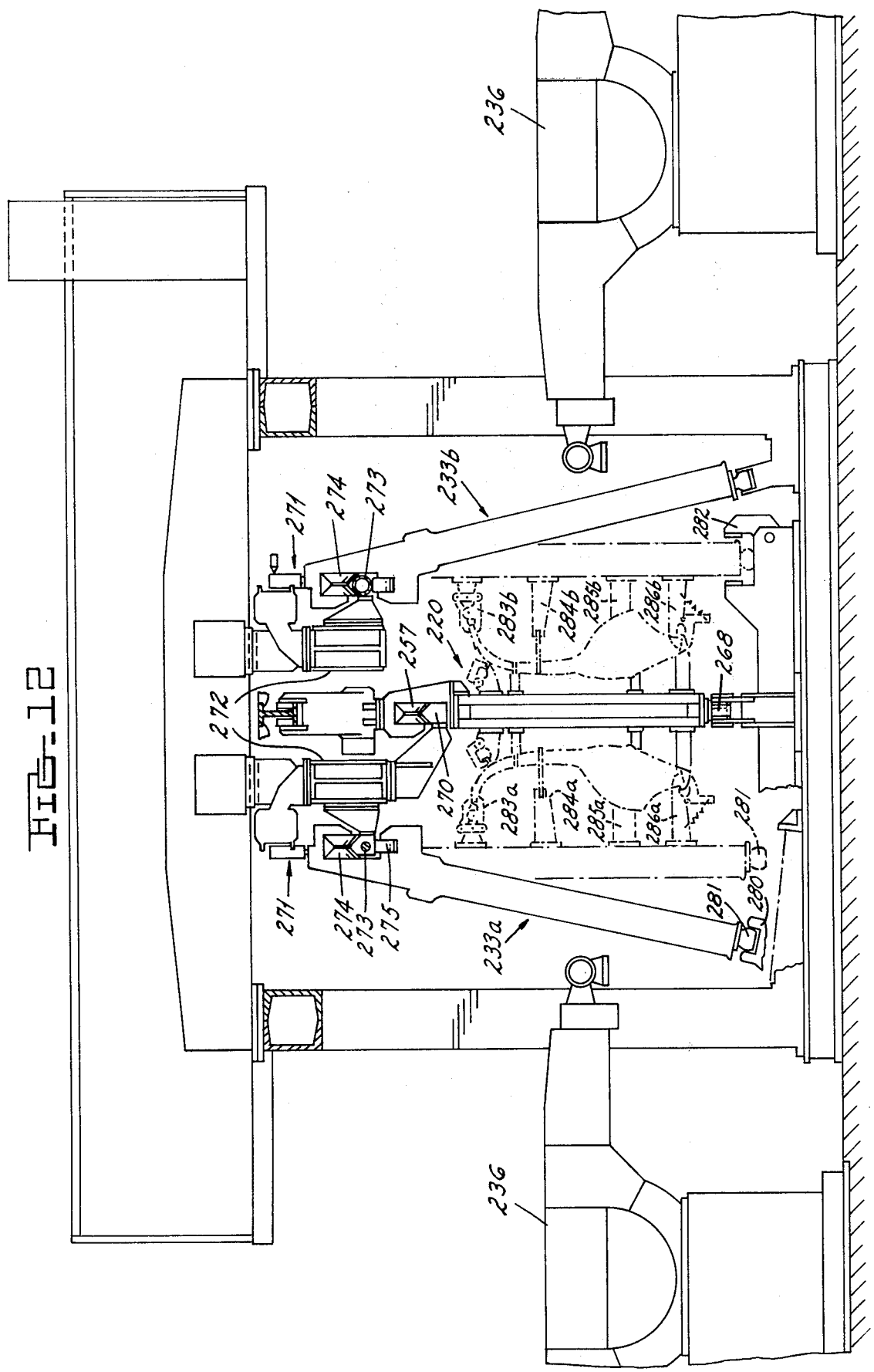

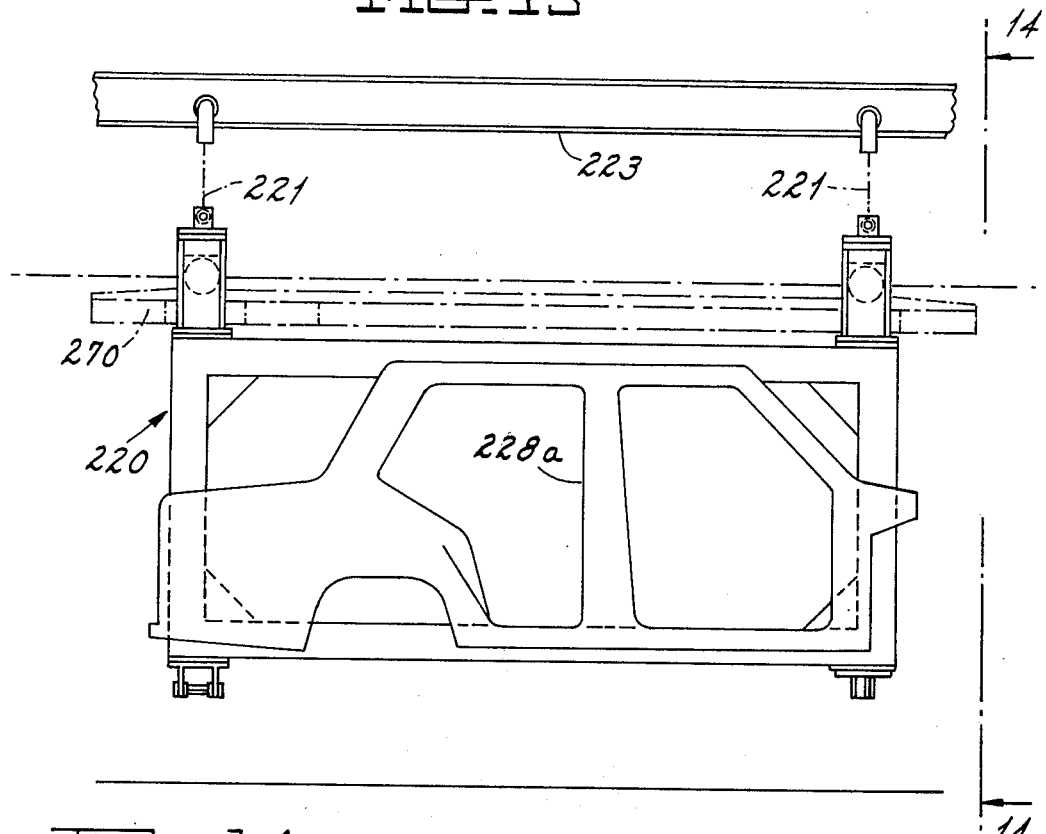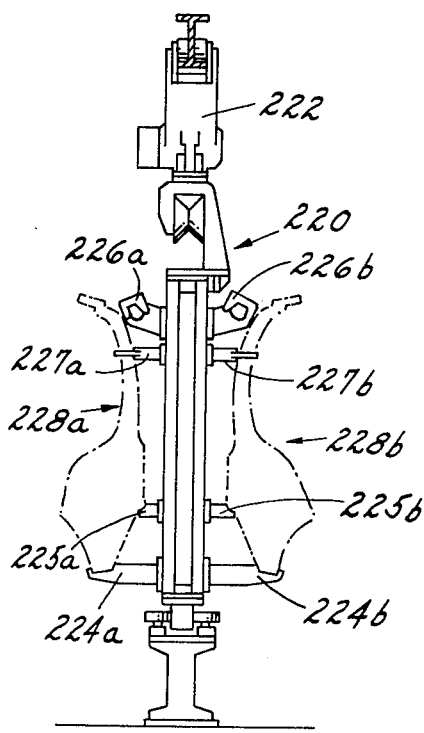

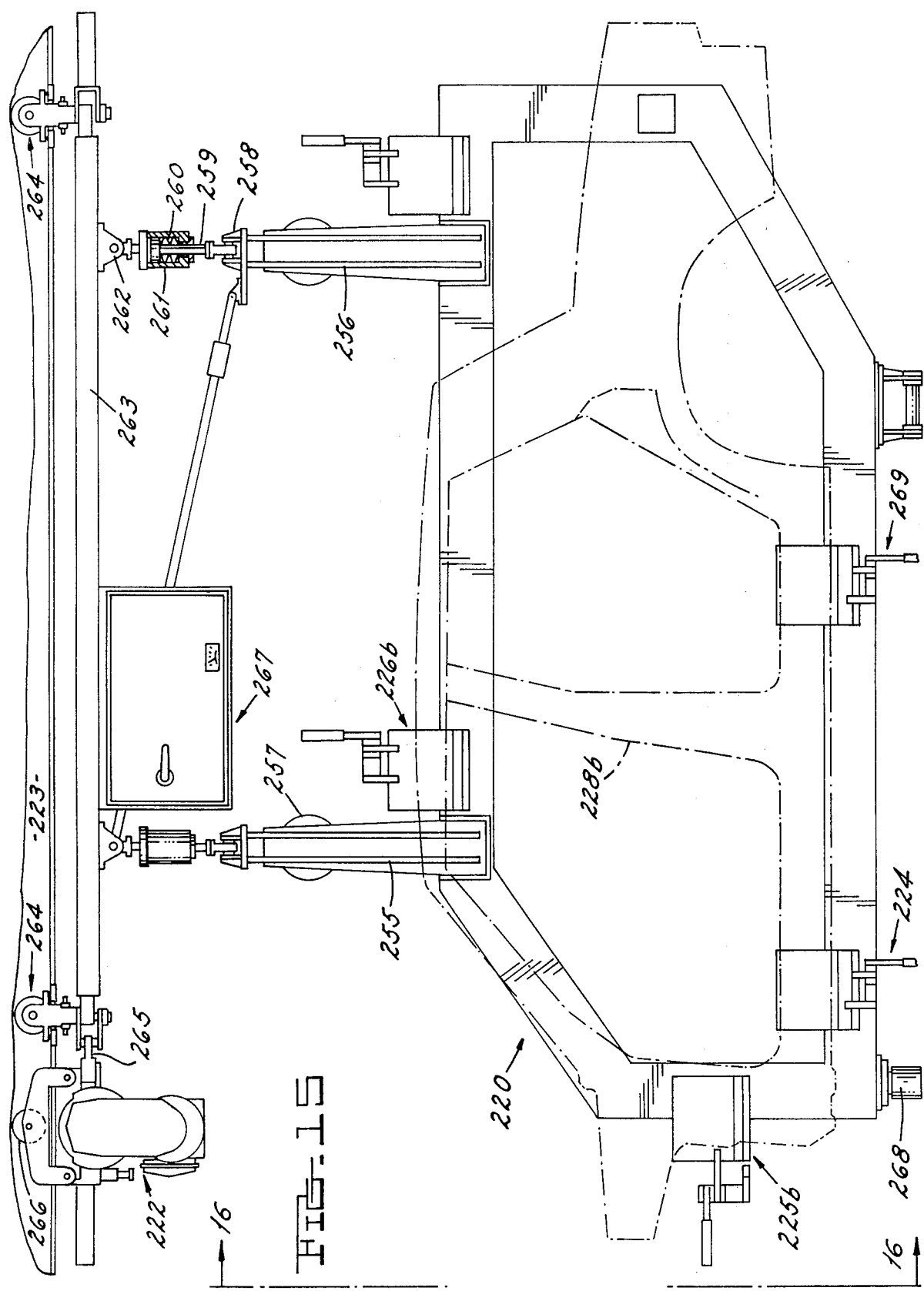

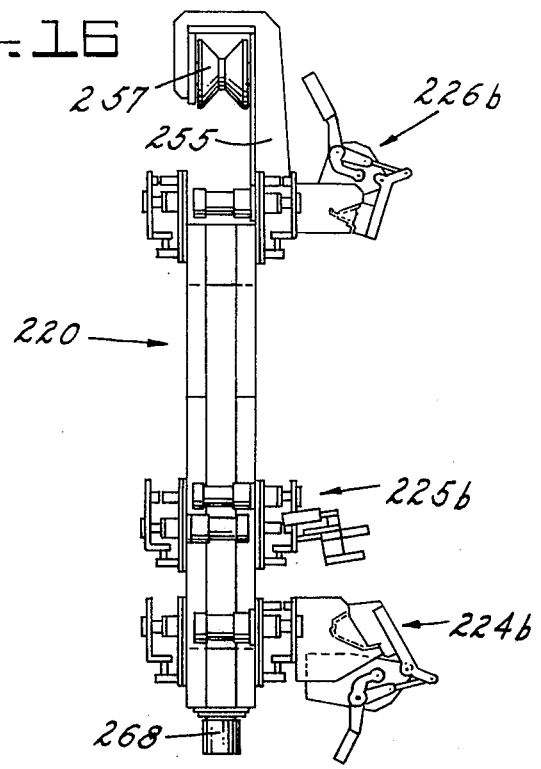
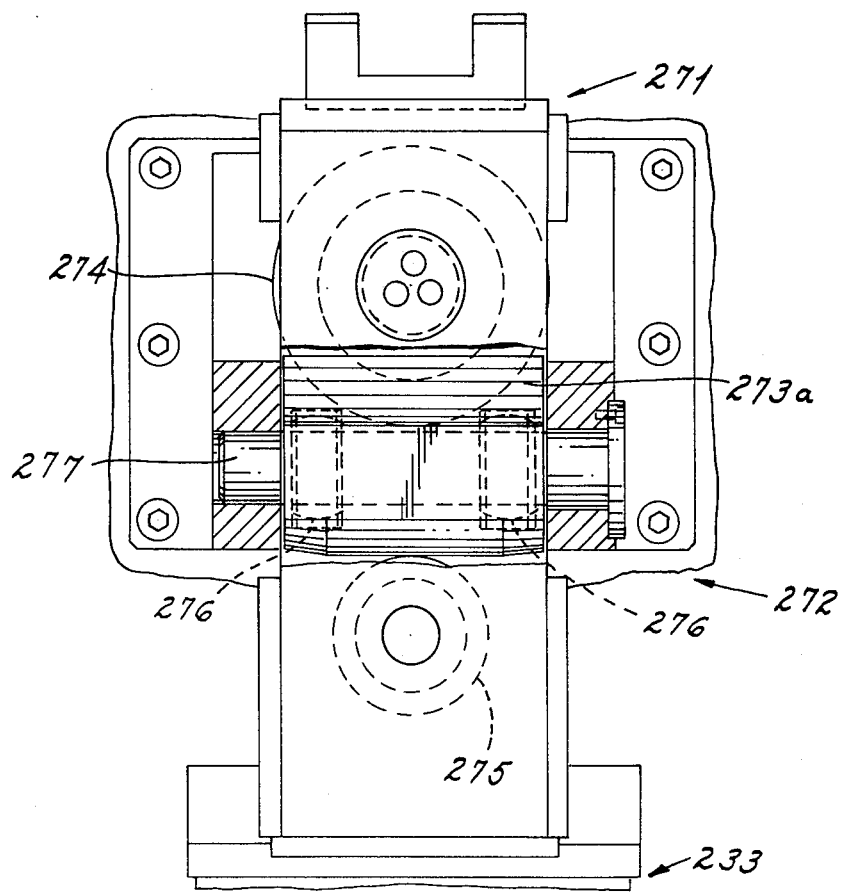

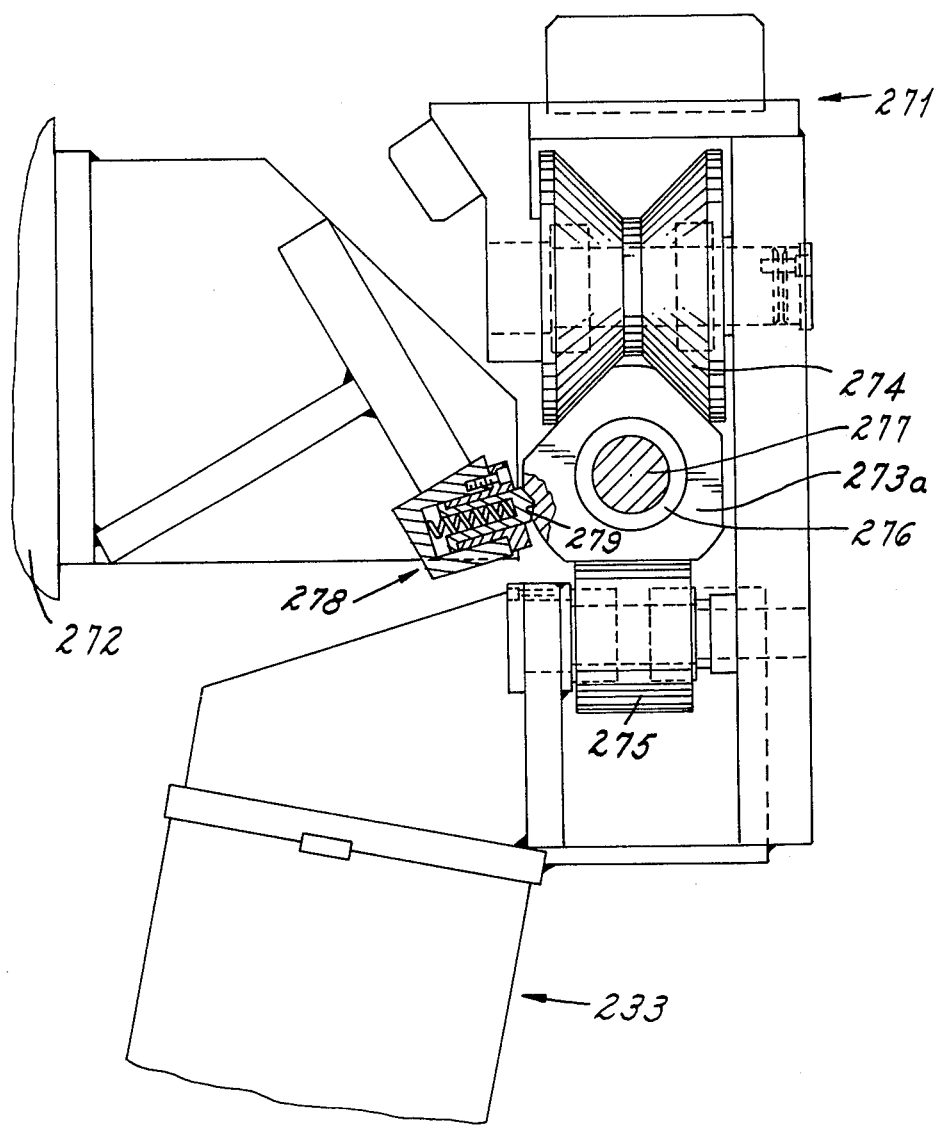

CAR BODY WELDING ASSEMBLY SYSTEM

RELATED APPLICATION

This application is a continuation-in-part of my prior application Ser. No. 803,960 filed on June 6, 1977 on which Notice of Allowance was mailed on Feb. 12, 1979, and U.S. Pat. No. 4,162,367 issued on July 24, 1979.

BACKGROUND OF THE INVENTION

In the United States most automotive vehicle bodies are manually welded on continuous flow carrousel gate lines. Different loosely assembled bodies may be pre-scheduled to move through the line on pallets or trucks with matching side locating "framing" gates, manual welding being employed as required for whatever body is moving on the line.

Some body assembly plants employ framing bucks which hold all main components—underbody, sides and top—in proper relation in a single special fixture, with manual welding likewise employed to accommodate different welding requirements for any particular body. In some cases automatic multiple spot welders are mounted on a framing head with pivoting pillars; however, in such cases the weld locations are fixed for each particular body with no provision for programming welding heads for different bodies.

In one case for a particular car model having three body styles, programmable robots were provided for respot or finish welding at successive fixed stations. Provision was made for initial framing of the main components in a first carrousel section where trucks carrying the underbody move continuously along with matching framing side gates for the individual body styles, the welding being performed partially by hand and partially by automatic welding heads limited to common weld spots for all three body styles with the continuous flow trucks returning to starting position at the end of each weld cycle. Hand welding was employed for any spots which differed for the various body styles. The robot welding programmed for automatic change for the different body styles all takes place in the second section after the body geometry is fixed in the first continuous flow carrousel framing station. Following the intermittent flow through the second robot section provision was made for the trucks to resume continuous flow through a third section where finish respot welding was manually performed.

In the case of automatic lines the transfer system is always a rigid system, which requires fixed steps from each welding station to the next one and a necessary route of the parts with a preset and constant speed of the transfer.

The disadvantage of this known system consists specifically in its rigidity, which makes extremely difficult and expensive the possible introduction or elimination of supplementary or intermediate operations and makes it necessary to rebuild all tooling for the production of a new model of car which must go through the same line.

With regard to major sheet metal vehicle body sub-assemblies, such as side apertures or doors, it is conventional practice to manually assemble component parts in a single purpose multi-spot press having no programmable robot features. The parts are accurately located by single purpose fixtures which typically provide welding of up to thirty spots per station. With such approach it is, of course, necessary to provide a complete multi-spot press with all necessary welding heads for each different multi-part sub-assembly with resultant high equipment costs for model changeover as well as production time delays in the order of four to six weeks.

SUMMARY OF THE INVENTION

The present invention is directed to provide an improved system of assembly by welding, which overcomes many of the above mentioned known systems, limitations and inconveniences; also to increase the flexibility at reduced cost for automatically welding different vehicle bodies in random progression on the same line; and to substantially reduce the cost of changeover retooling for new body styles. In order to realize the above mentioned purposes, the present invention comprehends a system for the assembly by welding of bodies for vehicles and similar structures comprising stamped sheet metal elements, characterized by the combination of: (a) a plurality of holding carrier pallets, each provided with reference and clamping devices, which are able to match with the lower surface of a preassembled body in white, to provisionally connect the stamped sheet metal elements which compose it, and to clamp this preassembled body in white on the pallet in a pre-established position; (b) one or more "framing" welding stations each having in addition to programmable welding devices interchangeable holding side frames hereafter called "side gates" able to engage a preassembled body supported by a pallet, to give this body the exact final geometry; (optionally interchangeable locators, as for "two-door" and "four-door" models, may be incorporated on a given side gate); and (c) supporting and transferring devices able to support with a stable bearing the pallets and to obtain their deplacement along a route passing through the welding stations.

Following this invention, the supporting and transferring devices for the pallets can be made either by self-contained motorized transferring units, by a step-by-step transfer line, or by a non-synchronous transfer line.

Following another object of this invention, a framing station is able to receive at least two different types of "side gates" each of which is equipped to operate on one type of body different from those for which the other types of "side gates" are equipped; devices are provided to displace to their operative position the needed type of "side gates," the others being in a waiting position.

The welding devices of each station are mainly constituted by robots having different programs chosen each time by a programmable controller according to the type of body to be welded.

Thus, the system comprehends intermittent transfer of different bodies to individual fixed stations, of rigid pallets for accurately mounting the underbody mounted on self-propelled trucks or moved in shuttle system or by a continuous conveyor with means for disengagement of the pallet drive at the respective fixed stations. Side gates provided at a given framing station may be interchangeable with other side gates or otherwise adapted to accommodate different bodies with provision for programmed welding to meet the requirements of each different body as by "robot" welding units. Reciprocable rapidly interchangeable gates may be provided where required to accommodate the side components of different bodies and alternate framing station may be employed to accommodate as many different bodies as the manufacturer wishes to assemble in a single system.

The system of the present application differs from any of the aforementioned known prior systems in a number of respects. All hand welding is eliminated and all automatic welding is performed at fixed stations eliminating any need for welding heads to move with a continuous flow line. In the preferred embodiment different bodies are accommodated at the same framing station through the provision of rapidly interchangeable side gates with programmable welding units adapted for automatic change to the different welding requirements of each of the bodies. Optionally, a given gate may be equipped with automatically interchangeable locators which may be adapted for different bodies such as "two-door" and "four-door" models otherwise generally similar in total body configuration. Provision is made for accommodating different underbody pallets where required for different bodies and complete flexibility may be achieved to ultimately handle any number of car body models and styles in any mixed order within a single system having all welding operations automatically performed.

Further flexibility and economy of changeover to new models is provided by minimizing the special tooling required for locating specific body components in the side gates and on the pallets which, together with the flexibility of the reprogrammable welding units, drastically reduce the expense of model changeover.

Thus, the advantages of the invention principally consist in the fact that it provides an automatic body assembly line, programmable with the possibility to automatically vary the program according to each type of body to be assembled; provides for varying at any moment the proportion of the production rate of one type of body in white respectively to another type; and permits retooling for a new type of body in a very short period and with minimized investment costs.

The foregoing system applied to assemble the main underbody, side and roof components of the complete body has been extended in accordance with the present added disclosure to apply to major sub-assemblies, such as side apertures or doors, which may be integrated into a total system including final body welding assembly or separately employed to produce different sub-assemblies as the finished products of a given sub-assembly system. Again the component parts may be preassembled in approximate configuration, introduced into a framing station which accurately orients the parts for initial tack welding in interfixed assembled relation, followed by completion of welding at respot stations and in some cases with further component parts added.

Similr advantages are realized in such sub-assembly lines as in the case of the system applied to final body welding assembly. Thus, side gates or equivalent fixturing may be interchangeably employed at an initial framing station with programmable welding robots adapted to initially weld any of the different sub-assemblies which may be processed in batch or random sequence. Model changeover may be effected by minor changes in the locating tooling of such side gates and changeover time literally reduced from many weeks to a few days, the reduced costs of such model changeover being one of the key features of such system as applied to any final or sub-assembly of different vehicle welded car bodies.

BRIEF DESCRIPTION OF THE DRAWINGS

In the drawings,

FIG. 3 is a schematic plan view of a plant provided with framing and other welding stations;

FIG. 4 shows a schematic side elevation of a modified assembly line including a variant to the construction of FIGS. 1 and 3;

FIG. 5 is a plan view of the assembly line shown in FIG. 4;

FIG. 6 is a sectional view taken along the line VI—VI of FIG. 5;

FIG. 7 is a schematic plan view of a further modified assembly line incorporating an alternative embodiment of the invention;

FIG. 8 is a side elevation of a side gate equipped with interchangeable locators for "two-door" and "four-door" models;

FIG. 9 is a plan view of the gate illustrated in FIG. 8;

FIG. 10 is a schematic plan view of a plant layout for an automotive vehicle side aperture welding system;

FIG. 11 is an enlarged fragmentary plan view of one of the framing stations illustrated in FIG. 10;

FIG. 12 is a further enlarged end view of the framing station of FIG. 11 taken along the line 12—12 of FIG. 11;

FIG. 13 is a fragmentary side elevation showing component parts of a side aperture as manually loaded on an overhead conveyor for transport from the loading area into one of the first framing stations illustrated in FIG. 10;

FIG. 14 is an end view taken along the line 14—14 of FIG. 13 but with a drive motor, omitted in FIG. 13, added at the top;

FIG. 15 is an enlarged side elevation similar to FIG. 13 illustrating additional components of the carrier suspension and drive motor;

FIG. 16 is an end elevation taken along the line 16—16 of FIG. 15;

FIG. 17 is an enlarged end elevation showing details of the gate suspension illustrated in FIG. 12;

FIG. 18 is a side elevation of the suspension of FIG. 17.

In FIGS. 1 and 2 a "framing" welding station 10 includes an inlet framework 12 and an outlet framework 14. In the upper corners of frameworks 12 and 14 two rails are affixed extending lengthwise across station 10. Two longitudinal lateral guides are arranged at the base of station 10 each comprising vertical shaft rollers 20 which guide a self-contained motorized transfer unit 22 having wheels 24 which are guided and controlled along a route through a "body in white" welding plant by known suitable control means.

Figure 1:
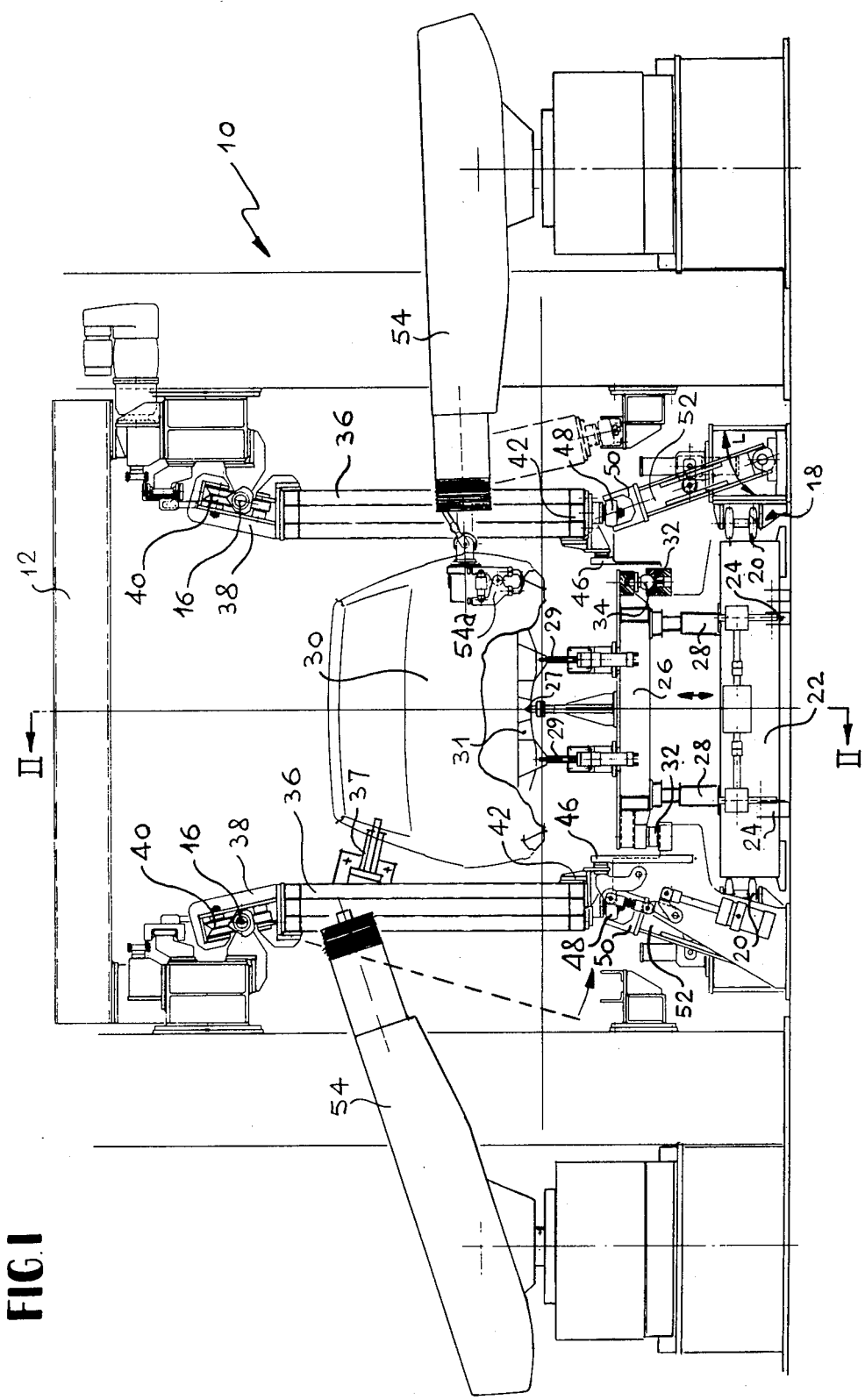
FIG. 1 is a front view, partially sectioned, of a "framing" welding station constructed in accordance with the present invention.

A pallet 26 is placed by manual or suitable mechanical means on the transfer unit 22 which can be raised and lowered by means of pneumatic or hydraulic cylinders 28. The pallet 26 is provided with locating devices 27 and clamping devices 29 matching the underbody 31 of a motor vehicle body which has been loosely preassembled provisionally connecting the stamped sheet metal elements prior to being clamped on the pallet. A welding station 10 is provided with four reference seats 32 for centering the spherical self-centering projections mounted on the pallet 26.

On each side of the station 10 two side gates 36 are provided on the upper ends 38 of which are mounted rollers 40 which run on the rails 16 and permit the side gates 36 to oscillate around the axes of the rails 16 and to run lengthwise on such rails. The lower ends 42 of the side gates 36 each have two stops 44 which react to locate reference surfaces 46 of the pallet 26.

As shown in FIG. 1 the lower ends 42 of the side gates 36 are located by means of a partially spherical roller 48 into a fork 50 placed on a control lever 52, which can oscillate in the direction of the arrow "L" shown in FIG. 1 to accommodate, by means of the roller 48 and the fork 50, oscillation of the respective side gate 36 with pivotal movement about the axis of rail 16.

Each one of the two pairs of side gates 36 has clamping devices, one of which is shown at 37, adapted to hold the preassembled body in white so as to establish its final geometry. The clamping devices carried by one of the two pairs of facing side gates 36 differ from those carried by the other pair of side gates 30 so that it is possible to utilize either pair of side gates 36 for welding two different types of bodies.

Welding station 10 is fitted with programmable robots 54, each provided with a welding gun 54a to perform spot welding.

The equipment shown and described thus far operates as follows: before the transfer unit enters the welding station 10 pneumatic or hydraulic cylinders 28 lift the pallet 26 on which the preassembled body 30 is clamped. After the unit has entered the station, cylinders 28 lower the pallet 26 until its centering spheres 34 engage the self-centering locating boxes 32. At this stage the two side gates 36 which were spread open to allow for the body 30 to enter, as shown in dotted lines on the right hand side of FIG. 1, close by pivoting on rails 16 until their stops 44 react against the reference surfaces 46 of pallet 26. As a result of such rotation side gates 36 clamp the preassembled body 30 and establish its final geometry.

When the body 30 is clamped by pallet 26 and side gates 36 the welding robots 54 start to operate as programmed. Such robots 54 perform different welding cycles according to the type of body 30 placed in station 10 and the choice of the programs is made by a suitable programmable controller or process computer which may control the entire system. At the end of the welding cycle robots 54 disengage themselves and the side gates 36 are unclamped from the body and swung outwardly to an open position through levers 52. Successively the pallet 26 is lifted up and carried out of station 10 by means of powered transfer unit 22.

When a type of body 30 different from the one being processed in station 10 approaches, the control system informs a control unit of station 10 and this transfers the pair of side gates 36 as soon as its working cycle is completed replacing it with the alternate pair of side gates 36, which was in a standby position, suitable for the new type of body.

Figure 2:
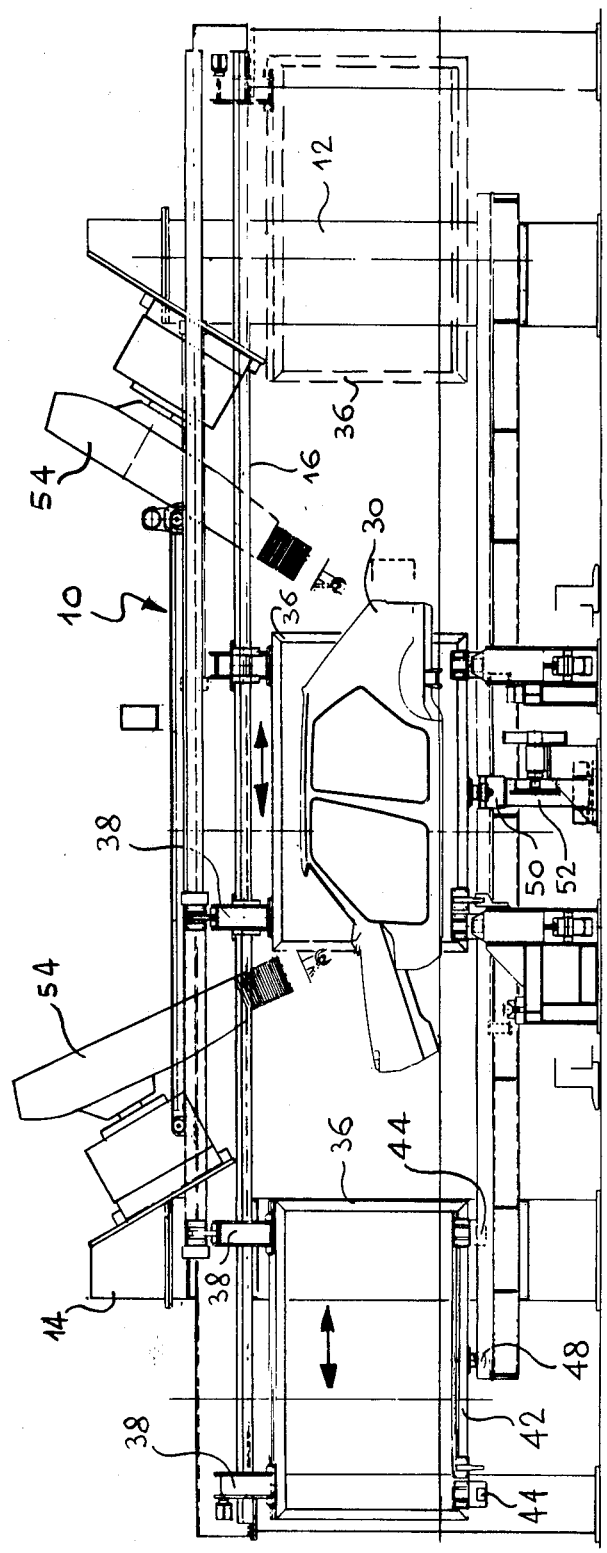
FIG. 2 is a schematic longitudinal section of the station taken along the line II—II of FIG. 1.

FIG. 3 shows a part of a welding plant which uses the described equipment with reference to FIGS. 1 and 2. An automatic store 56 controlled by suitable means contains pallets 26 to rigidly and accurately locate the underbody. Before entering into the loading station 58 each transfer unit 22 passes in front of the automatic store 56 where it receives the pallet equipped to receive the type of body which is arriving at the loading station.

The bodies which are loosely preassembled in an area not shown in the drawing, arrive at the loading station 58 by means of a suitable transfer device and are loaded onto the pallet by a downstroke lift. Once the transfer has been effected the bodies are disengaged from the lift and automatically clamped to the pallet by suitable known means. The bodies are clamped on the pallet in registration with the lower body reference points and are then transferred by the powered transfer units to one of the successive stations.

If more bodies are involved in the line they can be accommodated by the two pairs of side gates at a single framing station such as shown in FIGS. 1 and 2, a plurality of framing stations may be employed in parallel, one of which is indicated at 60 in FIG. 3 together with an alternate route schematically indicating the alternative parallel stations. In the case of multiple framing stations, a selection may be made by a suitable controller which identifies the framing station corresponding to the body to be welded. Where more than one identical framing station is employed to meet production requirements, the controller may also identify either a free station or the one which is closest to the completion of its work cycle.

The framing welding operation is then performed, as in station 60, which determines the overall geometry of the finished body as previously described. The body thus geometrically defined and welded in fixed geometrical configuration is then transferred to a series of successive stations such as 62, 64 and 66, the number of which may be increased or diminished due to the flexibility of the system, for the completion welding to be performed in order to give the body its required mechanical strength.

In the modified embodiment shown in FIGS. 4 to 6 two different types of bodies respectively indicated as 30a and 30b carried on correspondingly equipped pallets shown as 26a and 26b pass through a "framing" welding station 110 by means of a step-by-step transfer line already described and here indicated at 122. The station 110 is provided similarly to station 10, described with references to FIGS. 1 and 2, with two pairs of side gates 36a and 36b running lengthwise on rail 16 and pivoting on the axes of these rails. Such side gates are likewise provided with locators and clamps (not shown) to give bodies 30a carried by pallets 26a their final geometric form before they are welded by robots 54, while side gates 36b are so equipped to operate in a similar way on the bodies 36b placed on pallets 26b.

In the example shown, a body 30a carried by pallet 26a is clamped between side gates 36a while a pair of side gates 36b is in a standby position. Loading of the bodies onto the pallets is performed at station 68 which includes two vertical mechanized stores 70a and 70b for pallets placed on each side of the transfer line 122. Each store is provided with a cross transfer means, as schematically shown at 72, to feed the pallet selected by a programmable controller to an elevator 74 which brings it to the position where the corresponding preassembled body is placed. The assembly represented by the pallet and body is then inserted onto the line 122.

At the exit from the welding station 110 the pallets are separated from their respective bodies which have stabily acquired their final configuration, and by means of a downstroke lifter 76 and an underneath return line 122a are transferred to the base of lifter 74 to be reinserted into their respective stores 70a and 70b in the station 68.

FIG. 7 shows schematically an alternative modification of the previously described equipment to apply the side gates against the preassembled bodies supported by relevant pallets and to replace automatically such pairs of side gates according to the type of body which reaches the welding station. Such alternative modification may be employed either in case the pallets are moved by means of self-contained transfer units, such as shown in FIGS. 1 to 3, or moved through a step-by-step transfer line as in FIGS. 4 to 6. At station 210, provided with welding robots 54, two types of bodies 30a and 30b may be accepted as shown in the example through a step-by-step transfer line 122. A circulating device for the side gates 30a and 30b is arranged on each side of station 210. Each circuit includes a forward lengthwise step-by-step branch 78 synchronized with the pallet motion; a fast return lengthwise branch 80; a transverse branch 82 before the welding station which couples the chosen side gates to the pallet carrying the relevant body; and a transverse branch 84 after the welding station to disengage the side gates from the pallet.

Two stores 86 feed the return branches 80 of the two circuits with the required pairs of side gates 36a or 36b by means of suitable transfer devices. The transfer units 88 are also used to bring back into the respective stores 86 the side gates not utilized.

With reference to FIGS. 8 and 9 a side gate 136a is shown equipped with locators "AB" common to both "two-door" and "four-door" models, locators "A" which may be moved in by a swivel-in mechanical device when a "two-door" model has to be assembled, and locators "B" which may be moved in by a swivel-in-mechanical device when a "four-door" model is to be assembled. Locators "B" replace locators "A" which swivel-out.

Such arrangement may be employed in some cases in lieu of a second pair of reciprocating gates, as disclosed in the foregoing embodiments, or may be employed in combination with one or both pairs of such reciprocating side gates in order to accommodate three or four body styles in a single framing station. The possibilities of further multiplying the number of different body types through the use of alternative parallel framing stations as illustrated in FIG. 3 will be readily apparent in order to meet an unlimited mix of body types in a single automatic body welding system.

With reference to FIG. 10 the present system applied to typical side apertures for an automotive vehicle includes as labeled a #1 MANUAL LOADING AREA; a pair of parallel #1 FRAMING STATIONS; a #1 RESPOT STATION; a #2 MANUAL LOADING AREA; a pair of parallel #2 FRAMING STATIONS; a pair of #2 RESPOT STATIONS; and a pair of AUTOMATIC UNLOADING STATIONS.

With additional reference to FIGS. 13 and 14 an overhead conveyor carrier 220 suspended at 221 is driven by a motor 222 (FIG. 14 only) along an overhead track 223. The carrier is provided with lower supports 224a and 224b inside locators 225a and 225b, 226a and 226b and retainers 227a and 227b for preliminary location of a pair of opposite vehicle body side apertures generally indicated as 228a and 228b manually loaded at the #1 MANUAL LOADING AREA at which eight operators are symbolically indicated. Component parts to be spot welded to the main side aperture at the #1 FRAMING STATION which are loaded along with the main side aperture at the manual loading area may vary from model to model. For example, in one case such parts may include hinges, drain trough, B-pillar, hinge pillar assembly, A-pillar reinforcement, quarter end filler, upper deck patch, and lock striker as such component parts are termed in the trade.

The drive motor 222 is adapted to drive the carrier 220 slowly through the manual loading areas. Transfer between alternative branch tracks is accomplished with the aid of conventional track switches under central computer control and to stop at framing and respot stations with the use of limit switch and power controls conventional in the art. Each station as illustrated in FIG. 10 is provided with three pairs of side gates 233a, 233b and 233c illustrated with the center side gates 233b in operative position at the framing station. The alternative side gates 233a or 233c may be reciprocated into operative position with the opposite end gates moving either to phantom position 234 or 235 as shown. Four programmable robots 236, each provided with a spot welding head, are provided at each of the #1 FRAMING STATIONS to perform initial pretack welding, e.g. in a specific side aperture case with 228 spot welds on each side, with all component parts accurately held in position by the side gates as hereinafter described in detail with reference to FIG. 12. Upon completion of initial pretack welding at the #1 FRAMING STATION each carrier proceeds along exit track 237 or 238 merging at track 239 into one or more respot stations, one of which is illustrated in FIG. 10 where further respot welding of the component parts of the side aperture is accomplished, e.g. with 228 respot welds in the mentioned specific case, by four additional robot welders 240. A pair of stabilizing side gates 241 may be adapted to locate and stabilize the side panel relative to the robots with one gate universally adapted for all three models eliminating the necessity for reciprocating gates at such station.

Each carrier next proceeds along track 242 through the #2 MANUAL LOADING AREA where additional component parts such as wheel house, A-pillar, and inner roof are manually loaded on each side aperture, moving therefrom along track 243 to one or the other of branch tracks 244 or 245 leading to one of the #2 FRAMING STATIONS where side gates and welding robots similar to those employed at the #1 FRAMING STATIONS accurately locate and complete the welding of the additionally loaded component parts, e.g. with 35 additional pretrack spot welds on each side. Each carrier then proceeds along exit track 246 or 247 to a merging track 248 and alternative track 249 or 250 leading to one of the #2 RESPOT STATIONS where additional respot welding, e.g. with 64 spot welds on each side, of the complete side aperture sub-assembly takes place through welding robots and stabilizing side gates similar to those employed at the #1 RESPOT STATIONS. The carriers next proceed along exit tracks 251 or 252 merging at track 253 to AUTOMATIC UNLOADING STATIONS, which are only schematically illustrated, employing conventional unloading apparatus.

With reference to FIGS. 15 and 16 providing enlarged views of the carrier illustrated in FIGS. 13 and 14 it will be seen that the carrier 220 is suspended from brackets 255 and 256 each provided with a V-wheel 257 for locating purposes at a framing station as hereinafter described. Each of the brackets 255 and 256 is in turn suspended from a clevis 258 connected to a rod 259 spring loaded on Belleville washers 260 within a cylindrical housing 261 in turn suspended at 262 from a longitudinal carrier beam 263 supported on either end by a trolley 264. The carrier assembly is propelled through a drive link 265 by the drive motor 222 through a pair of drive wheels 266 engaging either side of the I-beam rail 223. The drive motor comprises a commercially available propulsion system differentially geared to provide a fast carrier speed in the order of 400 ft. per minute, a slow speed in the order of 30 ft. per minute which may be employed in manual loading and in final approach to any station requiring stationary operations, as well as a brake automatically engaged with power off.

A unit controller 267 is mounted on each carrier adapted to receive information from a central computer relative to destination and operation of track switches with memory sufficient to control movement between stations and check points.

The carrier is provided with manually operated toggle clamps such as 226b, 225b and 224b for manual loading and retention of major components of the side aperture such as 228b to be tack welded at the first framing stations.

The carrier 220 is provided at its lower forward end with a roller 268 adapted to engage a fixed guide rail in the floor wherever stabilizing and positioning is required and adapted to be clamped with a V-clamp at any station for accurately achieving both longitudinal and side locations. The cylindrical bar 269 rigidly mounted at the rear of the carrier is adapted for engagement by cylindrical clamps for side location only.

With reference also to the framing station of FIG. 12 it will be seen that when the carrier 220 with a pair of side aperture assemblies supported thereon is propelled into a framing station, the V-wheels 257 are adapted to engage and ride up on a fixed V-guide rail 270, shown in phantom in FIG. 13, which raises the carrier slightly as permitted by decompression of the spring loaded Belleville washers 260 so that the height of the carrier may be accurately established at both ends for accurate station operations. When the carrier reaches limit switches, not shown, the motor drive is stopped, brakes applied and the longitudinal position of the carrier accurately located by lateral V-clamps, not shown engaging the forward roller 268 and cylindrical side clamps engaging the rear locating bar 269.

As the carrier approaches a framing station the proper side gates 233b, if not already longitudinally located at the station, may be reciprocated into position by a rack and pinion drive 271 mounted on fixed I-beams 272 along fixed rails 273 to a position where they may be swung inwardly to the locating position shown in phantom in FIG. 12. A pair of longitudinally spaced V-wheel rollers 274 for each side gate are rotatably mounted on axles rigidly fixed to the side gate frame which throughout its reciprocating travel is held in its laterally outward position as illustrated in full line by the combination of such V-wheels 274 and cooperating lower roller bearings 275 engaging the flat underside of the fixed rail 273 while the V-wheels 274 engage the cooperating V-shaped surface of the rails 273.

With reference to FIGS. 17 and 18 the wheel and roller suspension for the gates is shown in detail. At each station location for the gate wheels 274 and rollers 275 the fixed track 273 for each side gate is interrupted by a section of such track 273a pivotally mounted on a pair of spherical bearings 276 and shaft 277 mounted in alignment with the fixed rail 273 so that when the V-wheels 274 reach such pivotable section of the track the side gate will be able to swing to its inward side aperture locating position. A spring loaded detent 278 engages a conical depression 279 in the pivoted section 273a of the track to normally retain it in alignment with the fixed portion of the track pending arrival of the gate wheels whereupon a slide having laterally movable jaw 280 engages a knob 281 at a central lower extremity of the gate which overcomes the detent and moves each gate to its innermost position where power operated end clamps 282 engage and rigidly hold each side gate. In cooperation with the roller mountings at the top accurate longitudinal location of the side gates is readily obtained by V-clamps cooperating with mating elements of the gates not shown.

Precision locating tooling on each side gate is indicated at 283a and b, 284a and b, 285a and b, and 286a and b to serve to accurately position all of the components of each side aperture for pretack welding as previously described.

From the foregoing disclosure of a specific side aperture system it will be understood that other major vehicle body sub-assemblies, such as doors, for multiple models may be accommodated in a single similar system employing alternative side gate or equivalent fixturing in combination with programmable robots thereby achieving the advantages of flexibility in welding major sub-assemblies of several vehicle body styles in the same system as well as the economy and speed of changeover to new models with simple change of final locating tooling within the standard alternative side gates or equivalent fixturing. The separate installation or integration of such sub-assembly systems into a total welding system to meet the particular requirements of a given body welding plant will be readily understood by those skilled in the art.

I claim:

1. A vehicle body welding system comprising, fixture means for accurately positioning multiple component parts of a vehicle body in relative juxtaposition at a framing welding station, programmable means for welding of said component parts into an inter-fixed assembled relation, said fixture means including interchangeable means for accurately locating different of said multiple component parts of different vehicle bodies at said station, means for mounting said fixture means for selective movement between an open position for admitting introduction of a preliminary preassembly of said component parts for any of said different vehicle bodies and a closed position in which said fixture means clamps said component parts for the immediate vehicle body in properly oriented configuration for welding, said programmable means including differently programmable means for welding said multiple component parts to match each different body at said station.

2. A system as set forth in claim 1 wherein said fixture means comprise interchangeable side gate means for accurately positioning multiple component parts of different vehicle bodies at said station.

3. A system as set forth in claim 1 including interchangeable side gate means having locating tooling adapted to laterally engage and locate different multiple component parts.

4. A system as set forth in claim 3 including reciprocable means for rapidly alternating different side gate means into operative position at side station.

5. A system as set forth in claim 1, 2, 3 or 4 including programmable robots having welding heads adapted to weld different spots as required to assemble said component parts for different bodies.

6. A system as set forth in claim 1 including successive welding stations for completing additional spot welds after the geometry of said interfixed assembled relation has been established by welding at said framing welding station.

7. A system as set forth in claim 2, 3 or 4 wherein said gate means comprise standard main structure common to different bodies and special replaceable tooling adapting each gate to each different body.

8. A system as set forth in claim 1 including overhead self-propelled carrier conveyor means for transporting said multiple component parts into said framing station and to successive stations.

9. A system as set forth in claim 2 including means for suspending said side gate means for lateral swinging between an inclined open position for admitting introduction of a preliminary preassembled complement of multiple component parts carried by said overhead conveyor means and a substantially vertical position in which said side gate means clamps the respective multiple component parts in relative juxtaposition for welding.

10. A system as set forth in claim 9 including rail means adapted to accommodate reciprocation of alternate gate means between standby and operative positions as well as said swinging movement of the operative side gate means into clamping position.

11. A system as set forth in claim 1 wherein said interchangeable means includes a side gate with different locators thereon adapted for different multiple component parts.

12. A system as set forth in claim 1 wherein said interchangeable means includes a side gate with different locators thereon adapted for different multiple component parts, said side gate also including other locators having a common position for said different component parts.

13. A system as set forth in claim 1 wherein said interchangeable means includes a side gate with interchangeable different locators thereon selectively movable to operative and inoperative positions adapted for different component parts.

14. A system as set forth in claim 1 wherein said interchangeable means includes a side gate with interchangeable different locators thereon selectively movable to operative and inoperative positions adapted for different component parts, said side gate also including other locators having a common position for said different component parts.

15. A system as set forth in claim 1 wherein said multiple component parts comprise a side aperture assembly.

16. A system as set forth in claim 15 wherein said stations include means adapted to pretack weld a pair of right and left laterally spaced side aperture assemblies.

17. A system as set forth in claim 16 including in sequence a manual loading area, a first framing welding station, a second manual loading area for adding additional component parts, and a second framing station with fixture means for accurately positioning additional component parts manually loaded at said second manual loading area, and programmable means for welding said additional component parts into an inter-fixed assembled relation with the parts assembled at said first framing welding station.

18. A system as set forth in claim 17 including a respot station interposed between said first framing station and said second manual loading area.

19. A system as set forth in claim 18 including respot station beyond said second framing station for adding additional welds to further inter-fix said multiple component parts in inter-fixed permanent assembled relation.

20. A system as set forth in claim 19 including a plurality of parallel framing stations adapted to perform similar welding operations on respective complements of multiple component parts at said respective stations.

21. A system as set forth in claim 4 wherein said reciprocable means includes rigid track means having engageable surfaces adapted to withstand transverse torque forces, each of said side gate means having longitudinally spaced means for engaging said track surfaces and supporting said side gate means in a relatively laterally displaced position during reciprocation to and from said station, said track means having longitudinally spaced pivotally mounted sections engageable by said side gate means at said station for accommodating lateral swinging movement of said gate means to the locating position for welding operations.

22. A system as set forth in claim 21 including means for normally retaining said pivotable sections in alignment with rigid portions of said track means.

23. A system as set forth in claim 22 wherein said track surfaces are planar and wherein said side gate spaced means includes anti-friction rolling elements for engaging said planar surfaces and mounted with means to withstand said transverse torque forces.

24. A system as set forth in claim 8 including means at said framing welding station for accurately locating said carrier conveyor means longitudinally, laterally and vertically.

25. A system as set forth in claim 24 wherein said means for accurately locating said carrier conveyor means includes a rigid longitudinally extending track means at said station engageable by said carrier conveyor means upon entering said station, and including means for raising said carrier conveyor means to said accurate vertical position.

* * * * *